J. COULSON.
ELECTROLYTE.
APPLICATION FILED FEB. 19, 1917.
1,390,505.
Patented Sept. 13, 1921.
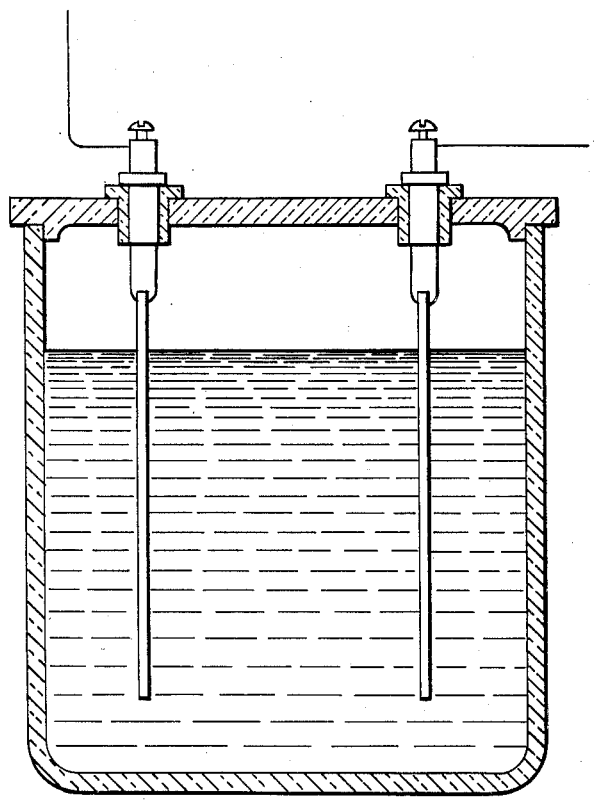
1 to 2% Solution of pyrogallic acid and ammonium citrate.
WITNESSES:
INVENTOR
John Coulson.
BY
ATTORNEY

UNITED STATES PATENT OFFICE.

JOHN COULSON, OF WILKINSBURG, PENNSYLVANIA, ASSIGNOR TO WESTINGHOUSE ELECTRIC AND MANUFACTURING COMPANY, A CORPORATION OF PENNSYLVANIA.

ELECTROLYTE.

1,390,505.           Specification of Letters Patent.    Patented Sept. 13, 1921.

Application filed February 19, 1917. Serial No. 149,533.

*To all whom it may concern:*

Be it known that I, JOHN COULSON, a subject of the King of Great Britain, and a resident of Wilkinsburg, in the county of Allegheny and State of Pennsylvania, have invented a new and useful Improvement in Electrolytes, of which the following is a specification.

My invention relates to electrolytes for use in electrolytic cells, such as lightning arresters, condensers and rectifiers, and it has for its object to provide an electrolyte which shall be capable of acting upon film-forming metals, such as aluminum, magnesium and the like, to produce dielectric films of great endurance when subjected to relatively high potentials for long periods of time, and to produce active plates of high electric capacity.

A considerable number of soluble substances have heretofore been employed in electrolytes for cells of the above-indicated character. Such electrolytes are valuable in proportion as they enable the plates of the cells to be continuously subjected to high potentials and also in proportion to the power losses in the cells and to the capacity of the plates, these factors of operating voltage, power losses and capacity being different with different electrolytes. The electrical characteristics of the cells are also dependent upon the concentration of the electrolytes, which should be chosen with due regard to the conditions under which the cells are to be operated.

I have discovered that electrolytes containing pyrogallic acid and salts of pyrogallic acid, preferably in the presence of ammonia or of weak bases, produce films upon film-forming metals which have great durability under high operating voltages with lower power-factor losses. A dilute solution of pyrogallic acid, containing also a small amount of ammonium citrate, gives excellent results.

The single figure of the accompanying drawing is a view, in section, of an electrolytic cell embodying my invention.

An electrolyte containing pyrogallic acid and ammonium citrate in concentration from 1% to 2%, when employed with aluminum condenser plates, will continuously withstand voltages of the order of 350 volts, with a power factor loss which remains substantially constant at about 15%. The critical or break-down voltage is considerably above 375 volts. The capacity of the plates immersed in this electrolyte is about $\frac{1}{20}$ microfarad per square centimeter of untreated aluminum, and about $\frac{1}{10}$ microfarad per square centimeter for plates which are given a preliminary treatment with acid according to the process described and claimed in my copending application for Letters Patent, Serial No. 54,590, filed October 7, 1915.

Electrolytes containing pyrogallic acid may be used both for initially forming films upon plates for use in electrolytic cells or for the continuous operation of such cells or both. It is to be understood that the specific substances and operating conditions which I have mentioned herein are intended to be merely illustrative of my invention and not as imposing limitations thereon, the scope of my invention being set forth in the appended claims.

I claim as my invention:

1. An electrolyte for electrolytic condensers, lightning arresters, rectifiers and the like comprising an aqueous solution containing pyrogallic acid radicals.

2. An electrolyte for electrolytic condensers, lightning arresters, rectifiers and the like containing pyrogallic acid radicals and weakly basic radicals.

3. An electrolyte for electrolytic condensers, lightning arresters, rectifiers and the like containing pyrogallic acid radicals and ammonium radicals.

4. An electrolyte for electrolytic condensers, lightning arresters, rectifiers and the like comprising pyrogallic acid radicals and citric acid radicals.

5. An electrolyte for electrolytic condensers, lightning arresters, rectifiers and the like comprising pyrogallic acid radicals, citric acid radicals and ammonium radicals.

6. An electrolyte for electrolytic condensers, lightning arresters, rectifiers and the like comprising an aqueous solution of pyrogallic acid and ammonium citrate.

7. An electrolyte for electrolytic condensers, lightning arresters, rectifiers and the like comprising an aqueous solution containing substantially 1% to 2% of dissolved material, such dissolved material comprising pyrogallic acid.

8. An electrolyte for electrolytic condensers, lightning arresters, rectifiers and the like comprising an aqueous solution containing substantially 1% to 2% of dissolved material, such dissolved material comprising pyrogallic acid and ammonium citrate.

In testimony whereof I have hereunto subscribed my name this 31st day of January, 1917.

JOHN COULSON.